US007257678B2

(12) United States Patent
Golden et al.

(10) Patent No.: US 7,257,678 B2
(45) Date of Patent: Aug. 14, 2007

(54) DYNAMIC RECONFIGURATION OF CACHE MEMORY

(75) Inventors: Michael L. Golden, Santa Clara, CA (US); Richard E. Klass, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 350 days.

(21) Appl. No.: 10/956,560

(22) Filed: Oct. 1, 2004

(65) Prior Publication Data

US 2006/0075192 A1    Apr. 6, 2006

(51) Int. Cl.
*G06F 12/00* (2006.01)
*G06F 13/00* (2006.01)

(52) U.S. Cl. .................. 711/118; 711/100; 711/122; 711/154

(58) Field of Classification Search ............ 711/100, 711/118, 122, 138, 154, 170
See application file for complete search history.

(56) References Cited

U.S. PATENT DOCUMENTS

| | | | |
|---|---|---|---|
| 5,649,156 A * | 7/1997 | Vishlitzky et al. .......... | 711/136 |
| 5,752,045 A | 5/1998 | Chen | |
| 5,881,311 A * | 3/1999 | Woods ..................... | 710/4 |
| 6,295,580 B1 | 9/2001 | Sturges | |
| 6,349,363 B2 | 2/2002 | Cai | |
| 6,751,706 B2 | 6/2004 | Chauvel | |
| 6,795,896 B1 | 9/2004 | Hart et al. | |
| 7,006,100 B2 | 2/2006 | Phong | |
| 7,089,391 B2 * | 8/2006 | Geiger et al. ............. | 711/170 |
| 7,093,081 B2 * | 8/2006 | DeWitt et al. ............. | 711/144 |

FOREIGN PATENT DOCUMENTS

EP    1 182 567    2/2002

OTHER PUBLICATIONS

Notification of Transmittal of the International Search Report and the Written Opinion of the International Searching Authority, or the Declaration, International application No. PCT/US2005/033671, Feb. 13, 2006.
International Search Report, International application No. PCT/US2005/033671, Sep. 21, 2005.
Written Opinion of the International Searching Authority, International application No. PCT/US2005/033671, Sep. 21, 2005.
Unsal, O., et al, "Cool-Cache for Hot Multimedia," Department of Electrical and Computer Engineering, University of Massachusetts, 2001, pp. 274-283.
"Power Managed Second-Level Cache Control, XP 000587428," IBM Technical Disclosure Bulletin, vol. 39, No. 04, Apr. 1996, pp. 79-82.

* cited by examiner

*Primary Examiner*—Tuan V. Thai
(74) *Attorney, Agent, or Firm*—Meyertons Hood Kivlin Kowert & Goetzel, P.C.; B. Noël Kivlin; Stephen J. Curran

(57) ABSTRACT

In one embodiment, a processing node includes a plurality of processor cores each including a cache memory coupled to a cache monitor unit and to a configuration unit. Each cache monitor unit may be configured to independently monitor a current utilization of the cache memory to which it is coupled and to determine whether the current utilization is below a predetermined utilization value. The configuration unit may selectably disable one or more portions of the cache memory in response to the cache monitor unit determining that the current utilization is below the predetermined utilization value.

23 Claims, 5 Drawing Sheets

DYNAMIC RECONFIGURATION OF CACHE MEMORY

BACKGROUND OF THE INVENTION

1. Field of the Invention

This invention is related to the field of microprocessors and chip multiprocessors (CMP) and, more particularly, to reconfiguration of cache memory of a processor.

2. Description of the Related Art

Modern microprocessors typically include on-chip cache memory. In many cases, microprocessors include an on-chip hierarchical cache structure that may include level one (L1), level two (L2) and in some cases a level three (L3) cache memory. Typical cache hierarchies may employ a small fast L1, cache that may be used to store the most frequently used cache lines. The L2 may be a larger and possibly slower cache for storing cache lines that are accessed but don't fit in the L1. The L3 cache may be used to store cache lines are accessed but do not fit in the L2 cache. Having a cache hierarchy as described above may improve processor performance by reducing the latencies associated with memory access by the processor core.

However, in certain instances such an improvement in performance may come at a cost. It is well known that modem microprocessors can consume a great deal of power and have high thermal budgets. Cache memories may consume power via static leakage even when they are not used. Thus, the larger the cache the more power consumed.

In an effort to increase efficiency and processor, chip multiprocessors (CMPs) are becoming an emerging technology that is gaining increased popularity. A CMP has two or more processor cores implemented on the same integrated circuit (IC) device. The increase in popularity may be due, at least in part, to the notion that a CMP may be a more efficient use of the millions of transistors that may be included on an integrated circuit than, for example, a more elaborate single processor. For example, by sharing processing loads between processor cores, a CMP may execute some tasks at a lower frequency than that required by some single core processors. Lower frequencies may translate in some cases to savings in power and a reduction in the thermal budget.

Since CMPs include multiple processor cores, they may also include circuitry associated with each core. For example, a CMP may include an L1 and an L2 cache memory for each processor core. Accordingly, for the reasons described above relative to single core microprocessors, the power consumption and thermal budget of a CMP may still be high. Thus, it may be desirable to find ways to reduce power consumption while maintaining processor performance.

SUMMARY

Various embodiments of dynamic reconfiguration of a cache memory are disclosed. In one embodiment, a processor includes a cache memory, such as an L2 cache, for example coupled to a cache monitor unit and a configuration unit. The cache monitor unit may be configured to monitor a current utilization of the cache memory and to determine whether the current utilization is below a predetermined utilization value. The configuration unit may selectably disable one or more portions of the cache memory in response to the cache monitor unit determining that the current utilization is below the predetermined utilization value.

In another embodiment, a processing node includes a plurality of processor cores each including a cache memory coupled to a cache monitor unit and to a configuration unit. Each cache monitor unit may be configured to independently monitor a current utilization of the cache memory to which it is coupled and to determine whether the current utilization is below a predetermined utilization value. The configuration unit may selectably disable one or more portions of the cache memory in response to the cache monitor unit determining that a given current utilization is below the predetermined utilization value.

Figure 1:
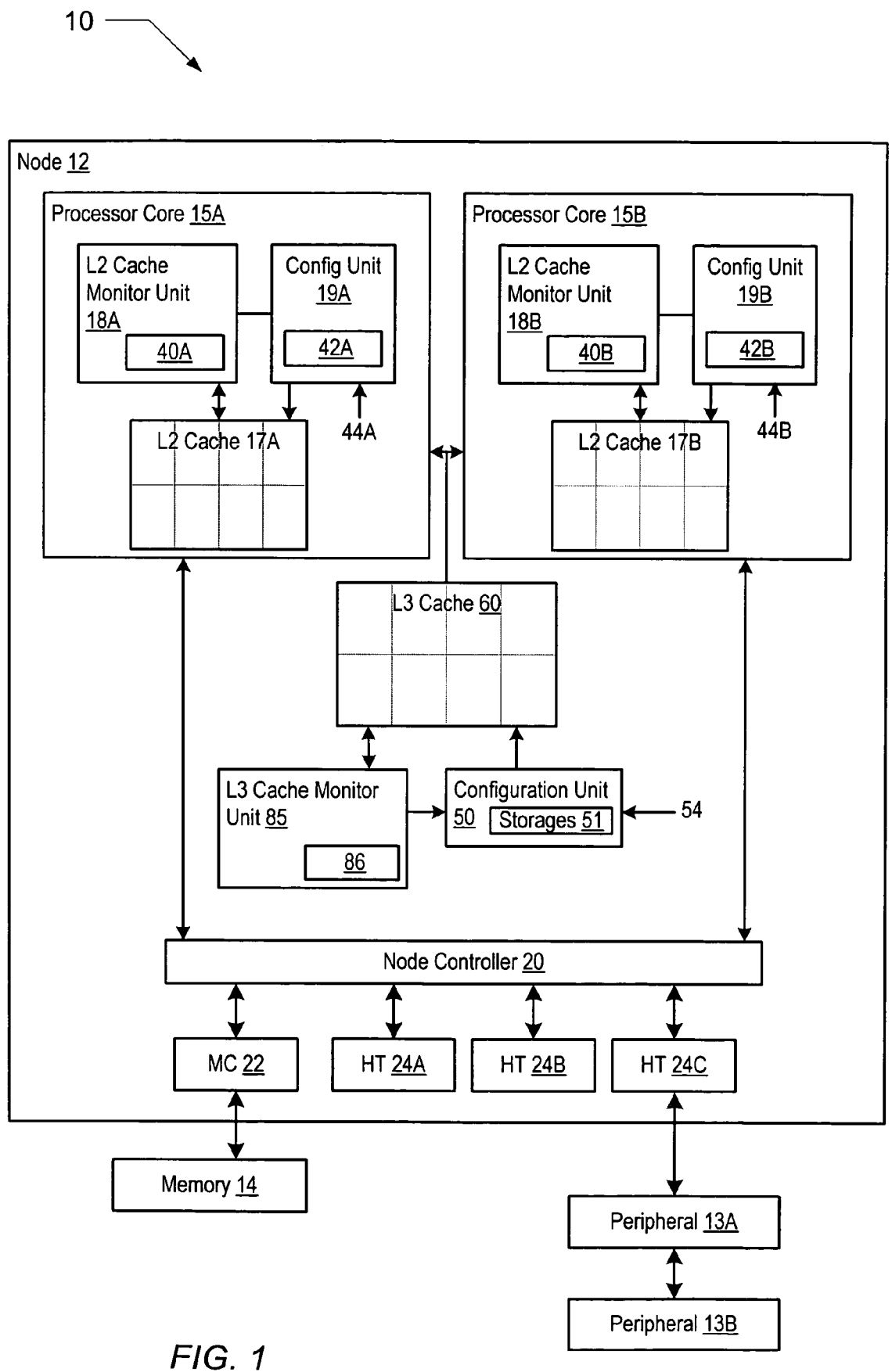
FIG. 1 is a block diagram of one embodiment of a computer system including a multi-core processing node and configurable cache memory.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Chip Multiprocessor with Dynamically Configurable Cache

Turning now to FIG. 1, a block diagram of one embodiment of a computer system 10 is shown. In the illustrated embodiment, the computer system 10 includes a processing node 12 coupled to memory 14 and to peripheral devices 13A-13B. The node 12 includes processor cores 15A-15B coupled to a node controller 20 which is further coupled to a memory controller 22 and a plurality of HyperTransport™ (HT) interface circuits 24A-24C. The processor cores 15A-15B are also coupled to a shared level three (L3) cache memory 60, which is coupled to an L3 cache monitor 85 and a configuration unit 50. The HT circuit 24C is coupled to the peripheral device 16A, which is coupled to the peripheral device 16B in a daisy-chain configuration (using HT interfaces, in this embodiment). The remaining HT circuits 24A-B may be connected to other similar processing nodes (not shown) via other HT interfaces (not shown). The memory controller 22 is coupled to the memory 14. In one embodiment, node 12 may be a single integrated circuit chip comprising the circuitry shown therein in FIG. 1. That is, node 12 may be a chip multiprocessor (CMP). Any level of integration or discrete components may be used. It is noted that processing node 12 may include various other circuits that have been omitted for simplicity.

In one embodiment, node controller 20 may include various interconnection circuits (not shown) for interconnecting processor cores 15A and 15B to each other, to other nodes and to memory. Node controller 20 may also include sets of fuses (not shown) that may be selectively blown during the manufacturing process to represent a plurality of values. In some embodiments, various node properties that may be selected by the fuses. The properties include the maximum and minimum operating frequencies for the node and the maximum and minimum power supply voltages for the node. In addition, the fuses may select processor-core specific properties.

The node controller 20 may generally be configured to route communications between the processor cores 15A-15B, the memory controller 22, and the HT circuits 24A-24C dependent upon the communication type, the address in the communication, etc. In one embodiment, the node controller 20 includes a system request queue (SRQ) into which received communications are written by the node controller 20. The node controller 20 may schedule communications from the SRQ for routing to the destination or destinations among the processor cores 15A-15B, the HT circuits 24A-24C, and the memory controller 22. Operation of the node 12 and its components will be discussed in more detail below.

Generally, the processor cores 15A-15B may use the interface(s) to the node controller 20 to communicate with other components of the computer system 10 (e.g. peripheral devices 16A-16B, other processor cores (not shown), the memory controller 22, etc.). The interface may be designed in any desired fashion. Cache coherent communication may be defined for the interface, in some embodiments. In one embodiment, communication on the interfaces between the node controller 20 and the processor cores 15A-15B may be in the form of packets similar to those used on the HT interfaces. In other embodiments, any desired communication may be used (e.g. transactions on a bus interface, packets of a different form, etc.). In other embodiments, the processor cores 15A-15B may share an interface to the node controller 20 (e.g. a shared bus interface). Generally, the communications from the processor cores 15A-15B may include requests such as read operations (to read a memory location or a register external to the processor core) and write operations (to write a memory location or external register), responses to probes (for cache coherent embodiments), interrupt acknowledgements, and system management messages, etc.

The memory 14 may include any suitable memory devices. For example, a memory 14 may comprise one or more RAMBUS DRAMs (RDRAMs), synchronous DRAMs (SDRAMs), double data rate (DDR) SDRAM, static RAM, etc. The memory controller 22 may comprise control circuitry for interfacing to the memories 14. Additionally, the memory controller 22 may include request queues for queuing memory requests, etc.

The HT circuits 24A-24C may comprise a variety of buffers and control circuitry for receiving packets from an HT link and for transmitting packets upon an HT link. The HT interface comprises unidirectional links for transmitting packets. Each HT circuit 24A-24C may be coupled to two such links (one for transmitting and one for receiving). A given HT interface may be operated in a cache coherent fashion (e.g. between processing nodes) or in a non-coherent fashion (e.g. to/from peripheral devices 16A-16B). In the illustrated embodiment, the HT circuits 24A-24B are not in use, and the HT circuit 24C is coupled via non-coherent links to the peripheral devices 16A-16B.

The peripheral devices 16A-16B may be any type of peripheral devices. For example, the peripheral devices 16A-16B may include devices for communicating with another computer system to which the devices may be coupled (e.g. network interface cards, circuitry similar to a network interface card that is integrated onto a main circuit board of a computer system, or modems). Furthermore, the peripheral devices 16A-16B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "peripheral device" is intended to encompass input/output (I/O) devices.

Generally, a processor core 15A-15B may include circuitry that is designed to execute instructions defined in a given instruction set architecture. That is, the processor core circuitry may be configured to fetch, decode, execute, and store results of the instructions defined in the instruction set architecture. For example, in one embodiment, processor cores 15A-15B may implement the x86 architecture. The processor cores 15A-15B may comprise any desired configurations, including superpipelined, superscalar, or combinations thereof. Other configurations may include scalar, pipelined, non-pipelined, etc. Various embodiments may employ out of order speculative execution or in order execution. The processor cores may include microcoding for one or more instructions or other functions, in combination with any of the above constructions. Various embodiments may implement a variety of other design features such as caches, translation lookaside buffers (TLBs), etc.

It is noted that, while the present embodiment uses the HT interface for communication between nodes and between a node and peripheral devices, other embodiments may use any desired interface or interfaces for either communication. For example, other packet based interfaces may be used, bus interfaces may be used, various standard peripheral interfaces may be used (e.g., peripheral component interconnect (PCI), PCI express, etc.), etc.

Configurable Cache Control

In the illustrated embodiment, processor core 15A includes an L2 cache 17A. Likewise, processor core 15B includes an L2 cache 17B. The respective L2 caches may be representative of any L2 cache found in a microprocessor. However, in one embodiment, the L2 caches 17A-17B may be implemented using a number of independently controllable memory blocks, as indicated by the dashed lines. In one implementation, each of the blocks may include an independently controllable power grid. As such the power (VDD) supplied to each of the memory blocks may be independently removed or in some cases the voltage supplied to the blocks by the individual power grids may be independently lowered.

Like the L2 caches described above, in the illustrated embodiment, the L3 cache 60 may also be implemented using a number of independently controllable memory blocks, as indicated by the dashed lines, in which each of the blocks may include an independently controllable power grid. As such the power (VDD) supplied to each of the memory blocks may be independently removed or in some cases VDD supplied to the blocks by the individual power grids may be independently lowered.

In the illustrated embodiment, similar to the L3 cache, each of the respective L2 cache memories 17A-17B are coupled to an L2 cache monitor unit 18A-18B, respectively and to a configuration unit 19A-19B, respectively. In one embodiment, each cache monitor unit (e.g., 18A, 19A, 85) may be configured to monitor the utilization of the respective cache memory connected to it. For example, L2 cache monitor unit 18A may monitor the utilization of L2 cache 17A. In the illustrated embodiment, each cache monitor unit includes circuits (e.g., 40A, 40B, 86) that may determine the current cache utilization and determine whether the current utilization is within a given utilization limit. More particularly, by way of example, cache monitor unit 18A may determine if the current utilization of L2 cache 17A is below a predetermine threshold value. If so, the cache monitor unit 18A may notify configuration unit 19A.

In one embodiment, configuration unit 19A includes one or more storages designated 42A such as programmable registers, for example, that may store values which correspond to various configuration preferences and states of the L2 cache 17A. Depending upon the values stored within storages 42A, configuration unit 19A may be programmed to selectably enable or disable one or more of the independently controllable memory blocks of L2 cache 17A in response to the notification from the L2 cache monitor 18A. In addition, the values stored within storages 42A may determine whether the power grid for a given block may be turned off or the voltage lowered. For example, in certain cases such as when processor core performs a context switch, the L2 cache may not be used for the new thread or context. However, it may be desirable for the data stored within L2 cache 17A to be ready when the context is switched back. In such cases, simply lowering the voltage to one or more blocks may allow the data stored therein to be retained but further access may be prohibited or disabled until the blocks are re-enabled and the voltage is brought back to normal.

Configuration unit 50 may be further configured to allow processor core 15A to share the L2 cache 17B of processor core 15B and vice versa dependent upon the configuration values stored within it. For example, in response to cache monitor 40A determining that the current utilization of L2 cache 17A is above an upper threshold value, configuration unit 42A may request access to L2 cache 17B. In such cases, configuration unit 42B, may allow the shared access if L2 cache 17B has blocks that are disabled and therefore sharable.

In one embodiment, the storages 42A, 42B and 51 of configuration units 19A, 19B and 50, respectively may include default preference values. Alternatively, preference values may be programmed into the storages. These preference values may be used to determine which action may be taken in response to receiving a notification from the corresponding cache monitor unit. For example, as described above, the configuration units may use these values to determine whether to disable the portions of the L2 cache in the corresponding processor core and the and L3 cache by removing power or lowering the voltage. In addition, in one embodiment, the configuration unit s may use the values to determine which, if any, portions of the L2 or L3 cache memories should be disabled at power-up.

In one embodiment, storages 42A, 42B and 51 may be programmed using software. For example, special instructions may be used to access storages 42A, 42B and 51. In another embodiment, storages 42A, 42B and 51 may be programmed more permanently using hard fuses as described above. In such an embodiment, the values are read from blown fuses and stored within the storages. In one embodiment, the hard fuses may be overridden by external programming. In such an embodiment, storages 42A, 42B and 51 may be programmed via configuration ports 44A, 44B and 54, respectively, via an external port such as the joint test action group (JTAG) port, for example. Overriding the hard fuses configuration in this way is sometimes referred to as programming via soft fuses.

In one embodiment, cache monitors 18A, 18B and 85 may determine the current utilization using the parameters such as how many entries of a respective cache are being used and how frequently the respective cache is accessed. In one implementation, the number of entries in a given cache that are being used may be determined without using probes using a counter (not shown explicitly, part of 40A, 40B and 86) to count writes to the cache and by monitoring whether a write generates a victim or not. If a victim is not generated, then the write must have resulted in the allocation of a new entry. Otherwise, the number of entries stays the same. Thus if a victim is generated the write may not be counted. In addition, in one implementation, the frequency in which a cache is accessed may be determined using a saturation counter, for example (not explicitly shown, part of circuit 40A). In one embodiment, the saturation counter may be incremented each time the cache is accessed. The counter may be decremented at some clock interval, but never below zero. If the count value stays above some predetermined value, it may be assumed that the cache access frequency is high; thereby indicating a high utilization. From these two parameters a lower predetermined utilization value and an upper predetermined utilization value may be calculated. It is noted that in other embodiments, other mechanisms may be employed to determine the cache utilization as desired.

It is noted that, while the computer system 10 illustrated in FIG. 1 includes one processing node 12, other embodiments may implement any number of processing nodes. Similarly, a processing node such as node 12 may include any number of processor cores, in various embodiments. Various embodiments of the computer system 10 may also include different numbers of HT interfaces per node 12, and differing numbers of peripheral devices 16 coupled to the node, etc.

Figure 2:
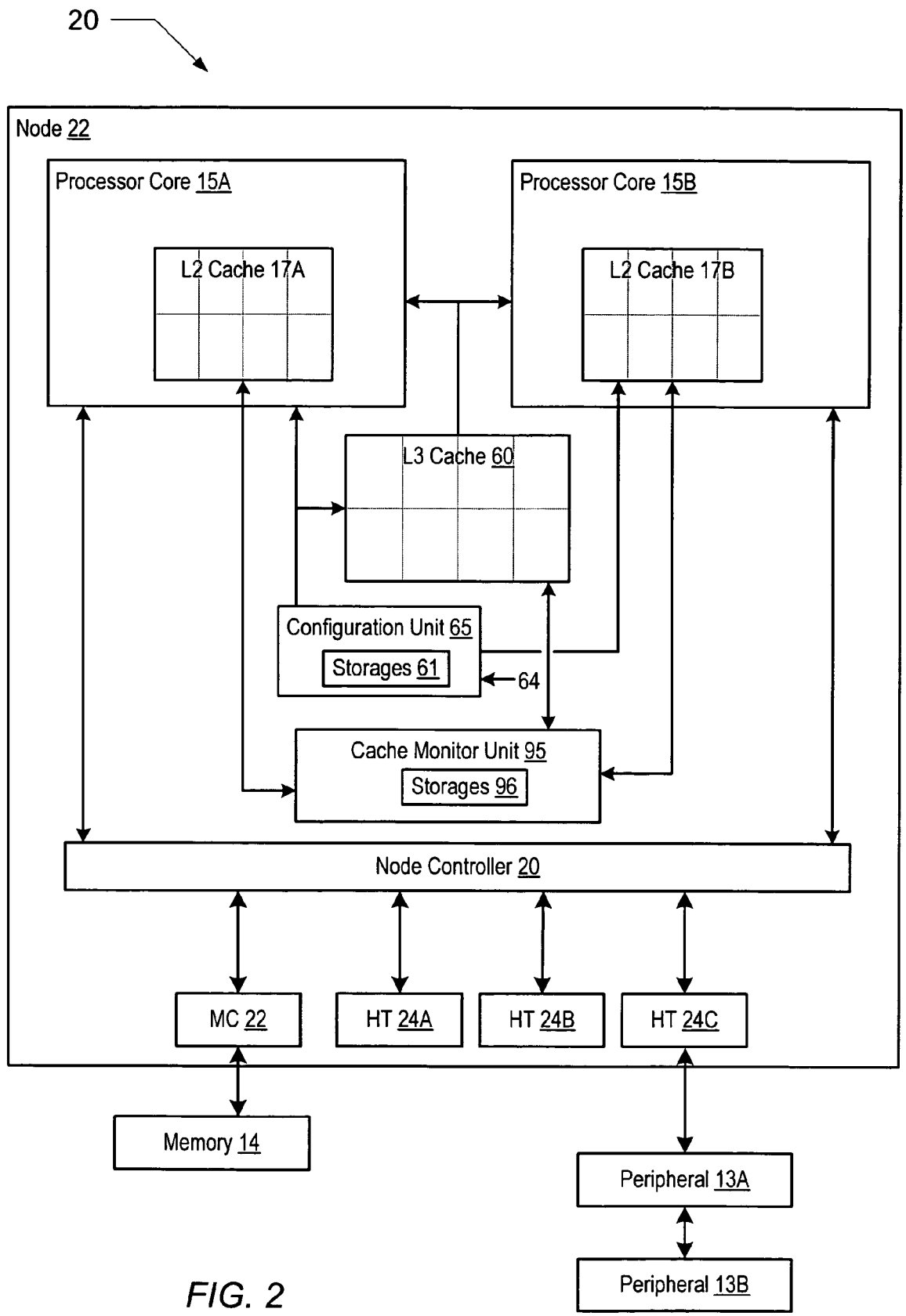
FIG. 2 is a block diagram of another embodiment of a computer system including a multi-core processing node and configurable cache memory.

Turning to FIG. 2 a block diagram of another embodiment of a computer system 20 is shown. Components that correspond to those shown in FIG. 1 are numbered identically for clarity and simplicity. Similar to the computer system 10 of FIG. 1, computers system 20 of FIG. 2 includes a processing node 22 coupled to a memory 14 and to peripheral devices 13A-13B. Processing node 22 includes similar functionality to node 12 of FIG. 1. Accordingly, differing functionality will be described while description of functionality common to node 12 will be omitted here for brevity. It is noted that processing node 12 of FIG. 2 may include various other circuits that have been omitted for simplicity.

In the embodiment illustrated in FIG. 2, like processing node 12, processing node 22 also includes processor cores 15A-15B coupled to a node controller 20 which is further coupled to a memory controller 22 and a plurality of HyperTransport™ (HT) interface circuits 24A-24C. In addition, the processor cores 15A-15B are also coupled to a shared level three (L3) cache memory 60. However, L3 cache 60 is coupled to a cache monitor 95 and a configuration unit 65. In one embodiment, node 22 may be a single integrated circuit chip comprising the circuitry shown therein in FIG. 2. That is, node 22 may be a chip multiprocessor (CMP).

In the illustrated embodiment, and in contrast to the embodiment of FIG. 1, each of the L2 cache memories 17A-17B are also coupled to cache monitor unit 95 and to configuration unit 65. In one embodiment, cache monitor unit 95 may be configured to monitor the utilization of all cache memories connected to it (e.g., L2 cache 17A-17B and L3 cache 60) using functionality as described above in conjunction with the description of FIG. 1.

In one embodiment, similar to the description above configuration unit 65 includes one or more storages designated 61 such as programmable registers, for example, that may store values which correspond to various configuration preferences and states of the L2 cache 17A-17B and L3 cache 60. Depending upon the values stored within storages 61, configuration unit 65 may be programmed to selectably enable or disable one or more of the independently controllable memory blocks of L2 cache 17A-17B and L3 cache 60 in response to the notification from the cache monitor unit 95. Likewise, the values stored within storages 61 may determine whether the power grid for a given block may be turned off or the voltage lowered. It is noted that storage 61 may be programmed similar to storages 42A, 42B and 51 described above.

Further, configuration unit 60 may be configured to allow processor core 15A to share the L2 cache 17B of processor core 15B and vice versa dependent upon the configuration values stored within it. For example, in response to cache monitor 95 determining that the current utilization of L2 cache 17A is above an upper threshold value, configuration unit 65 may enable access to L2 cache 17B by processor core 15A. In such cases, configuration unit 65, may allow the shared access if L2 cache 17B has blocks that are disabled and therefore sharable.

Figure 3:
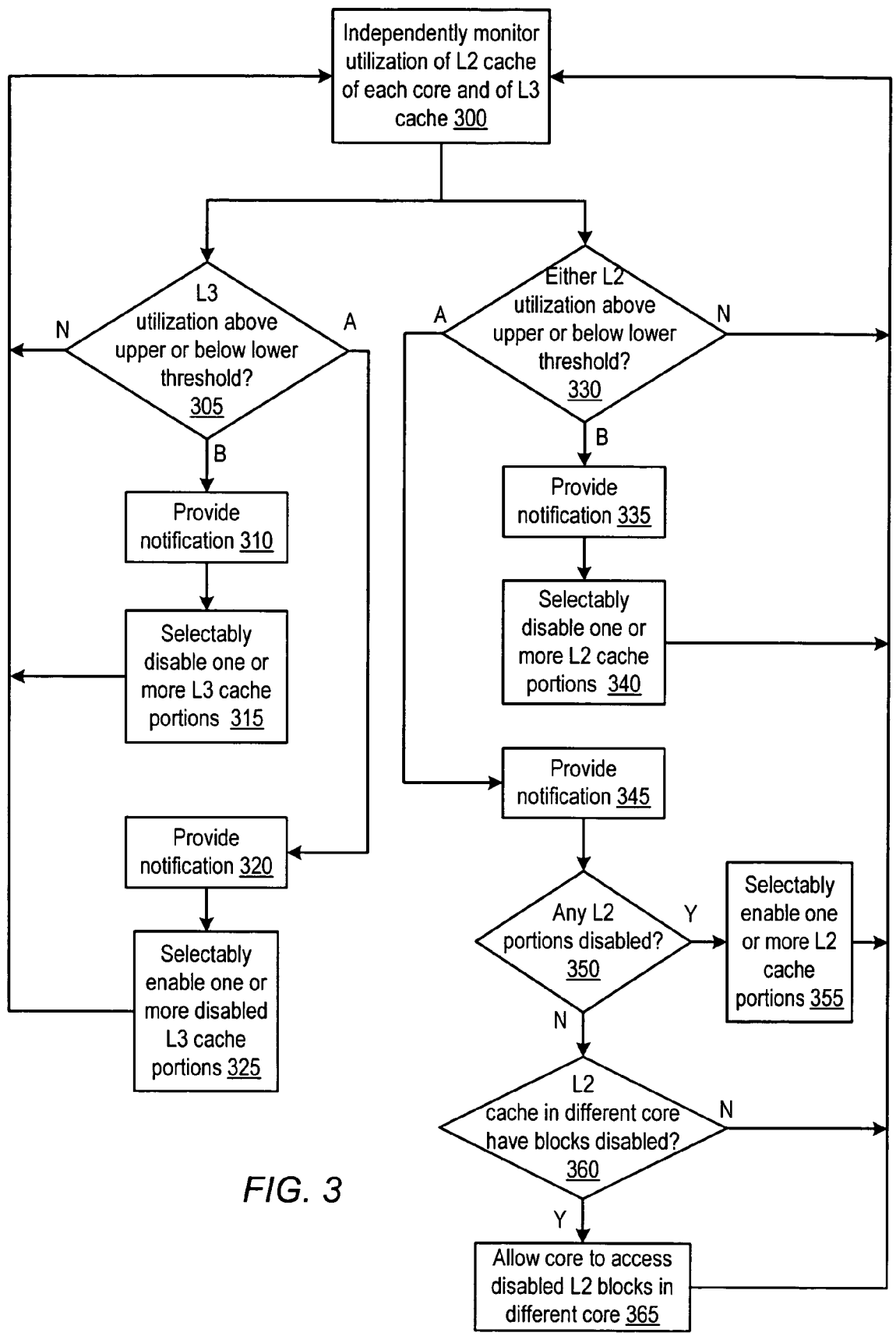
FIG. 3 is a flow diagram describing the operation of one embodiment of a processing node.

FIG. 3 illustrates a flow diagram describing the operation of one embodiment of processing node 12. Referring collectively to FIG. 1 and FIG. 3, in one embodiment, when node 12 is first powered up or brought out of reset, the configuration values stored within configuration unit 42A may be read and used to configure L2 cache 17A. Likewise, the configuration values stored within configuration unit 42B may be read and used to configure L2 cache 17B and the configuration values stored within configuration unit 50 may be read and used to configure L3 cache 60. During operation of node 12, cache monitor units 18A, 18B and 85 are configured to monitor the current utilization of their respective cache memories (block 300). For example, as described above, cache monitor units 18A, 18B and 85 may track cache access frequency and cache entry use to determine the current utilization for their respective caches.

In block 305, based upon the current utilization, cache monitor unit 85 may determine whether the respective current utilization is within predetermined limits. In one embodiment, cache monitor unit 85 may compare the current utilization of L3 cache 60 to an upper threshold value and a lower threshold value.

If the current utilization is within the predetermined threshold values, cache monitor unit 85 continues to monitor the utilization of L3 cache 60 as described above in block 300. However, if the current utilization is not within the predetermined threshold values and is below the lower threshold value (block 305), cache monitor unit 85 may provide notification to configuration unit 50 (block 310). Configuration unit 50 may selectably disable one or more blocks of L3 cache 60 (block 315). In one embodiment, configuration unit 50 may disable blocks according to configuration preferences stored within storages 51 and in response to the notification. For example, as described above, power may be removed from the selected blocks or it may be reduced to a lower voltage. In addition, in one embodiment, the blocks selected first may be the blocks furthest away from the processor cores 15A-15B, since these blocks may represent the longest path delay. Once the selected blocks have been disabled, cache monitor 85 continues to monitor the utilization as described above in block 300.

Referring back to block 305, if the current utilization is not within the predetermined threshold values and is above the upper threshold value, cache monitor unit 85 may provide notification to configuration unit 50 (block 320). Configuration unit 50 may selectably enable one or more disabled blocks of L3 cache 60 (block 315) if there are disabled blocks. In one embodiment, configuration unit 50 may enable blocks according to configuration preferences stored in storages 51. Once the selected blocks have been re-enabled, cache monitor 85 continues to monitor the utilization as described above in block 300.

In block 330, based upon the current utilization, cache monitor units 18A and 18B may determine whether the respective current utilization is within predetermined limits. More particularly, in one embodiment cache monitor units 18A, 18B may compare the current utilization of L2 caches 17A-17B to an upper threshold value and a lower threshold value.

If the current utilization is within the predetermined threshold values, cache monitor units 18A, 18B continue to monitor the utilization of L2 caches 17A-17B as described above in block 300. However, if the current utilization of either cache is not within the predetermined threshold values and is below the lower threshold value (block 330), the appropriate cache monitor unit 18A-18B may provide notification to configuration unit 19A-19B (block 335). Configuration units 19A-19B may selectably disable one or more blocks of the corresponding L2 caches 17A-17B (block 340). In one embodiment, configuration units 19A-19B may disable blocks according to configuration preferences stored within storages 42A-42B, respectively and in response to the notification. For example, as described above, power may be removed from the selected blocks or it may be reduced to a lower voltage. In addition, in one embodiment, the blocks selected first may be the blocks furthest away from the CPU logic of processor cores 15A-15B, since these blocks may represent the longest path delay. Once the selected blocks have been disabled, cache monitor units 18A-18B continue to monitor the utilization as described above in block 300.

Referring back to block 330, if the current utilization is not within the predetermined threshold values and is above the upper threshold value, cache monitor units 18A-18B may provide notification to configuration unit 19A-19B (block 345). If any L2 blocks are disabled in the affected L2 cache (block 350), configuration unit 19A-19B may selectably enable one or more blocks of L2 caches 17A-17B (block 355). In one embodiment, configuration units 19A-19B may disable blocks according to configuration preferences stored within storages 42A-42B, respectively and in response to the notification. For example, as described above, power may be removed from the selected blocks or it may be reduced to a lower voltage. In addition, in one embodiment, the blocks selected first may be the blocks furthest away from the processor cores 15A-15B, since these blocks may represent the longest path delay. Once the selected blocks have been disabled, cache monitor units 18A-18B continue to monitor the utilization as described above in block 300.

However, if there are no disabled blocks in the affected L2 cache (block 350), the configuration unit of the affected L2 cache (i.e., the L2 cache that is over-utilized) may request from the configuration unit of the other processor core, access permission to share the L2 cache of the other core. For example, if cache monitor unit 18B determines that the current utilization of L2 cache 17B is over the upper threshold, configuration unit 19B may request access from configuration unit 19A to L2 cache 17A. In response to the request, configuration unit 19A may determine if L2 cache 17A has disabled blocks to share (block 360). If so, configuration unit 19A may grant access to processor core 15B to share the disabled blocks of L2 cache 17A (block 365). The disabled blocks may be re-enabled. Operation proceeds as described above in block 300.

The descriptions of FIG. 4 and FIG. 5, below, provide additional embodiments of configurable cache memory in the context of a microprocessor including a single processor core.

Single Microprocessor with Dynamically Configurable Cache

Figure 4:
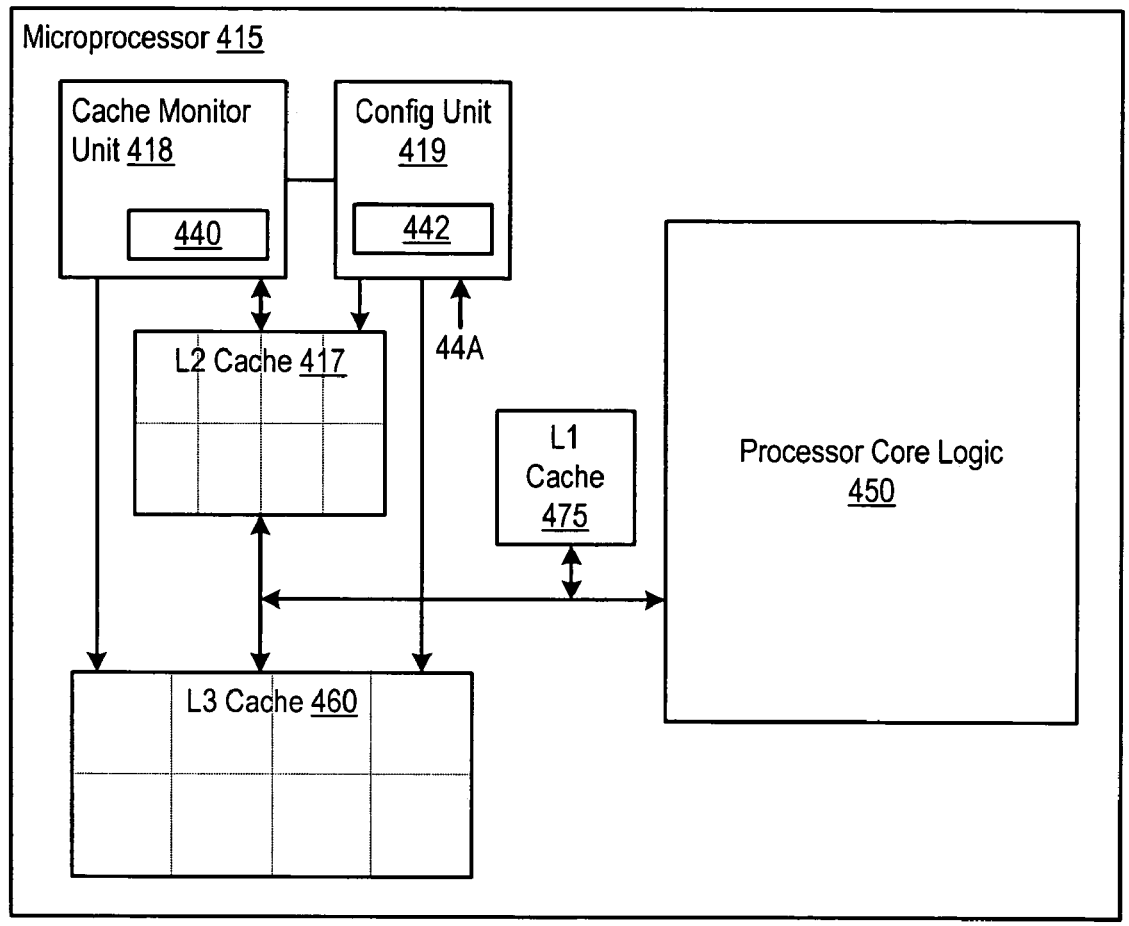
FIG. 4 is a block diagram of one embodiment of microprocessor including a single processor core and configurable cache memory.

Referring now to FIG. 4, a block diagram of one embodiment of a microprocessor including a single processor core and configurable cache memory is shown. Microprocessor 415 includes processor core logic 450 which is coupled to an L1 cache 475, an L2 cache 417 and an L3 cache 460. Microprocessor 415 also includes a cache monitor unit 418 that is coupled to the L2 cache 417 and the L3 cache 460. Further, microprocessor 415 includes a configuration unit 419 that is coupled to cache monitor 418 and to each of L1 cache 475, L2 cache 417 and L3 cache 460. It is noted that microprocessor 415 may include various other circuits that have been omitted for simplicity.

In the illustrated embodiment, the functionality of cache monitor 418 and configuration unit 419 is similar to that of L2 cache monitor 95 and configuration unit 65 described above in conjunction with FIG. 2 and FIG. 3. Accordingly, their description has been omitted here for brevity.

Figure 5:
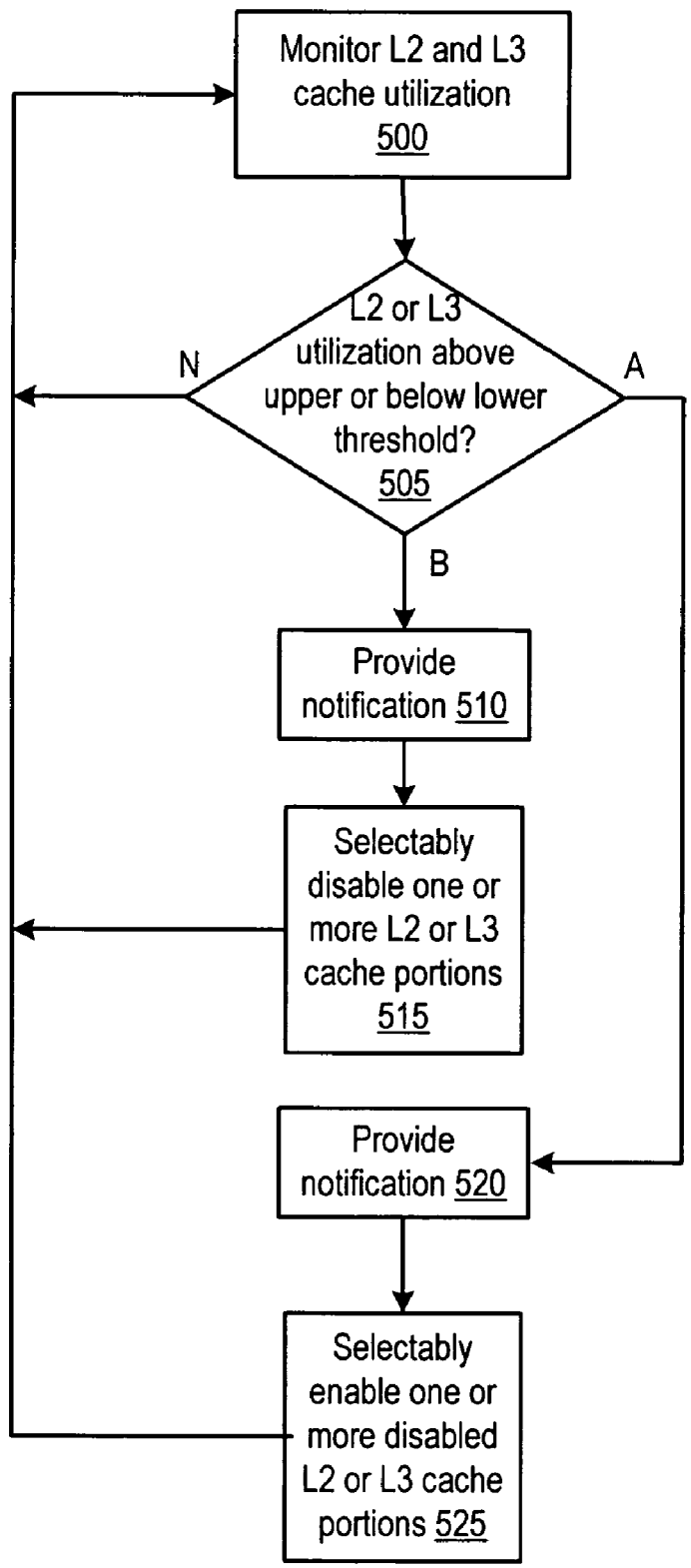
FIG. 5 is a flow diagram describing the operation of one embodiment of the microprocessor of FIG. 4.

Turning to FIG. 5, a flow diagram describing the operation of one embodiment of the microprocessor of FIG. 4 is shown. Referring collectively to FIG. 4 and FIG. 5, in one embodiment, when microprocessor 415 is first powered up or brought out of reset, the configuration values stored within storages 442 of configuration unit 419 may be read and used to configure L2 cache 417. Likewise, the configuration values stored within configuration unit 419 may be read and used to configure L3 cache 460. During operation of microprocessor 415, cache monitor unit 418 is configured to monitor the current utilization of each of the cache memories (block 500). For example, as described above, cache monitor unit 418 may track cache access frequency and cache entry use to determine the current utilization for each cache.

In block 505, based upon the current utilization, cache monitor unit 418 may determine whether the respective current utilization of each cache is within predetermined limits. In one embodiment, cache monitor unit 418 may compare the current utilization of L2 cache 417 and the current utilization of L3 cache 460 to an upper threshold value and a lower threshold value.

If the current utilization is within the predetermined threshold values, cache monitor unit 418 continues to monitor the utilization of L2 cache 417 and L3 cache 460 as described above in block 500. However, if the current utilization is not within the predetermined threshold values and is below the lower threshold value (block 505), cache monitor unit 418 may provide notification to configuration unit 419 (block 510). Configuration unit 419 may selectably disable one or more blocks of either L2 cache 417 and L3 cache 460 (block 515). In one embodiment, configuration unit 419 may disable blocks according to configuration preferences stored within storages 442 and in response to the notification. For example, as described above, power may be removed from the selected blocks or it may be reduced to a lower voltage. In addition, in one embodiment, the blocks selected first may be the blocks furthest away from the processor core logic 450, since these blocks may represent the longest path delay. Once the selected blocks have been disabled, cache monitor 418 continues to monitor the utilization as described above in block 500.

Referring back to block 505, if the current utilization is not within the predetermined threshold values and is above the upper threshold value, cache monitor unit 418 may provide notification to configuration unit 419 (block 320). Configuration unit 419 may selectably enable one or more disabled blocks of either L2 cache 417 and L3 cache 460 (block 525) if there are disabled blocks. In one embodiment, configuration unit 419 may enable blocks according to configuration preferences stored in storages 442. Once the selected blocks have been re-enabled, cache monitor 418 continues to monitor the utilization as described above in block 500.

Similar to the description above, in one embodiment, storages 440 and 442 may be programmed using software. For example, special instructions may be used to access storages 440 and 442. In another embodiment, storages 440 and 442 may be programmed more permanently using hard fuses as described above. In such an embodiment, the values are read from blown fuses and stored within the storages. In one embodiment, the hard fuses may be overridden by external programming. In such an embodiment, storages 440 and 442 may be programmed via configuration port 44A via an external port such as the joint test action group (JTAG) port, for example. Overriding the hard fuses configuration in this way is sometimes referred to as programming via soft fuses.

It is noted that in the embodiments described above, an L3 cache memory is shown. However, it is contemplated that other embodiments may not include an L3 cache. The absence of an L3 cache does not in any way detract from the configurability of the L2 caches.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for configuring a cache memory of a processor, the method comprising:

monitoring a current utilization of the cache memory;

determining whether the current utilization is below a predetermined utilization value; and selectably disabling one or more portions of the cache memory in response to determining that the current utilization is below the predetermined utilization value.

2. The method as recited in claim 1, further comprising storing the predetermined utilization value within a configurable storage.

3. The method as recited in claim 1, wherein determining whether the utilization is below a predetermined utilization value includes comparing the predetermined utilization value with the current utilization.

4. The method as recited in claim 1, further comprising determining the current utilization value by determining a number of entries being used in the cache memory and determining how frequently the cache memory is accessed.

5. The method as recited in claim 4, wherein determining a number of entries being used in the cache memory includes monitoring a number of writes to the cache memory that cause a victim to be generated.

6. The method as recited in claim 4, wherein determining how frequently the cache memory is accessed includes counting a number of accesses to the cache memory using a counter.

7. The method as recited in claim 1, wherein disabling one or more portions of the cache memory includes removing power from the one or more portions.

8. The method as recited in claim 1, wherein disabling one or more portions of the cache memory includes lowering a voltage supplied to the one or more portions.

9. The method as recited in claim 1, wherein the cache memory is a level two (L2) cache memory.

10. The method as recited in claim 1, wherein the cache memory is a level three (L3) cache memory.

11. A method for dynamically configuring a processing node including a plurality of processor cores, each processor core including a cache memory, the method comprising:
independently monitoring a respective current utilization corresponding to each of the cache memories;
determining whether the respective current utilization is below a predetermined utilization value;
in response to determining that the respective current utilization is below the predetermined utilization value selectably disabling one or more portions of the corresponding cache memory.

12. The method as recited in claim 11, further comprising storing the predetermined utilization value within a configurable storage.

13. The method as recited in claim 11, further comprising determining the current utilization value by determining a number of entries being used in the cache memory and determining how frequently the cache memory is accessed.

14. The method as recited in claim 11, wherein disabling one or more portions of the corresponding cache memory includes removing power from the one or more portions.

15. The method as recited in claim 11, wherein disabling one or more portions of the corresponding cache memory includes lowering a voltage supplied to the one or more portions.

16. The method as recited in claim 11, wherein each of the cache memories is a level two (L2) cache memory.

17. The method as recited in claim 11, further comprising in response to disabling one or more portions of a given cache memory of a respective processor core and in response to determining that the current utilization of another cache memory of a different processor core has exceeded a second predetermined utilization value, selectively enabling the different processor core to share the given cache memory.

18. The method as recited in claim 11, further comprising:
monitoring a current utilization corresponding to a cache memory shared by the plurality of processor cores;
determining whether the current utilization is below a predetermined utilization value;
in response to determining that the current utilization is below the predetermined utilization value selectably disabling one or more portions of the shared cache memory.

19. A processor comprising:
a cache memory;
a cache monitor unit coupled to the cache memory and configured to monitor a current utilization of the cache memory and to determine whether the current utilization is below a predetermined utilization value; and
a configuration unit coupled to the cache monitor unit and to the cache memory, wherein the cache configuration unit is configured to selectably disable one or more portions of the cache memory in response to the cache monitor unit determining that the current utilization is below the predetermined utilization value.

20. A processing node comprising:
a plurality of processor cores each including:
a cache memory;
a cache monitor unit coupled to the cache memory, wherein each cache monitor unit is configured to independently monitor a current utilization of the cache memory to which each cache monitor unit is coupled and to determine whether the current utilization is below a predetermined utilization value; and
a configuration unit coupled to the cache monitor unit and to the cache memory, wherein the cache configuration unit is configured to selectably disable one or more portions of the corresponding cache memory to which the configuration unit is coupled in response to the cache monitor unit determining that the current utilization is below the predetermined utilization value.

21. The processing node as recited in claim 20, further comprising a shared cache memory accessible to each of the plurality of processor cores.

22. The processing node as recited in claim 21, further comprising an additional cache monitor unit coupled to the shared cache memory and additional configuration unit coupled to the shared cache memory, wherein the additional cache monitor unit is configured to monitor a current shared cache utilization and to determine whether the current shared cache utilization is below a second predetermined utilization value.

23. The processing node as recited in claim 22, wherein the additional configuration unit is configured to selectably disable one or more portions of the shared cache memory in response to determining that the current shared cache utilization is below the second predetermined utilization value.

* * * * *